Aug. 14, 1951     D. D. FOSTER     2,563,998
DIRECTION FINDING APPARATUS
Filed March 1, 1946     2 Sheets-Sheet 1
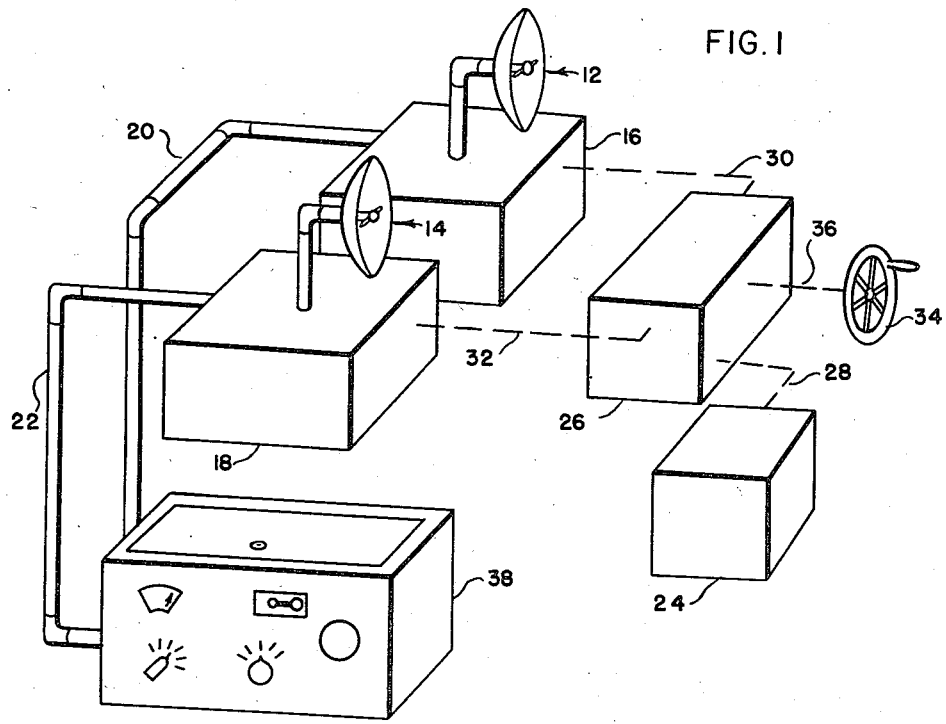
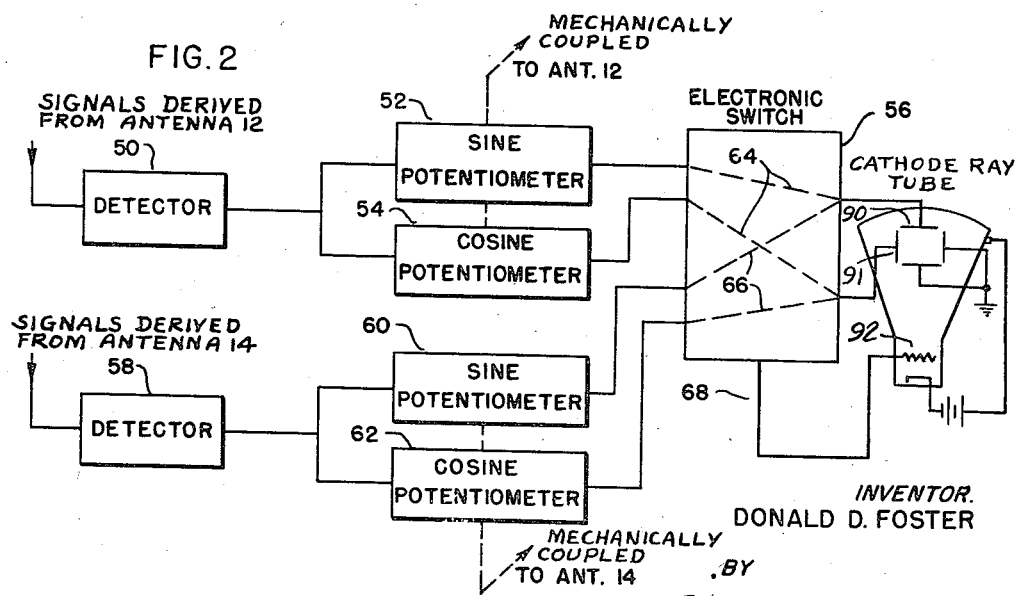
INVENTOR.
DONALD D. FOSTER
BY
William D. Hall
ATTORNEY Aug. 14, 1951  D. D. FOSTER  2,563,998
DIRECTION FINDING APPARATUS
Filed March 1, 1946  2 Sheets-Sheet 2

*INVENTOR.*
DONALD D. FOSTER
BY
William D. Hall
*ATTORNEY*

Patented Aug. 14, 1951

2,563,998

UNITED STATES PATENT OFFICE 2,563,998

DIRECTION FINDING APPARATUS

Donald D. Foster, Concord, Mass., assignor to the Government of the United States of America as represented by the Secretary of War Application March 1, 1946, Serial No. 651,309

2 Claims. (Cl. 343—118)

This invention relates to direction finding apparatus and more particularly to apparatus for determining the position of a distant radio transmitter having a rotating or scanning antenna.

Certain radio direction finders known in the prior art will satisfactorily determine the direction of a distant transmitting station, provided that the transmitting station has an energy radiation pattern that is stationary in space. According to conventional practice, such a radio direction finding system is located at some convenient point within receiver range of the transmitting station, the directional antenna of the radio direction finding system is rotated in an azimuthal plane until a maximum or a minimum signal is supplied to the indicator of the system, and the direction to the distant transmitting station is then determined by making reference to the receiving pattern of the antenna of the direction finding system. This system, however, will not accurately determine the position of a distant transmitting station if the energy radiation pattern of this station is not stationary in space.

Such a moving or non-stationary radiation pattern may be caused by a rotating or scanning antenna employed by the transmitting station, or it may be caused by various other means. The movement of the radiation pattern in space is, of course, not under the control of the operator of the radio direction finding system, but operation of the present invention is not dependent upon such control nor upon a particular type of movement of the transmitting station radiation pattern. For simplicity it will therefore be assumed that the movement of the radiation pattern in space is caused by a rotating antenna structure, and for brevity all such movement of the radiation pattern in space will hereinafter be referred to as being caused by the rotation of the transmitting antenna.

If an attempt is made to determine, with a said prior art direction finder, the position of a station having a rotating transmitting antenna, it will be found that the position of the maximum or minimum signals continually shifts, because the intensity of the signal supplied to the indicator of the system is a function of the gain of the receiving antenna and of the instantaneous field strength from the distant station. In a modified system of the prior art type referred to, the approximate position of the transmitting station may be determined by the method of rotating the receiving antenna at either a very high speed or a very low speed compared to the rate of movement of the transmitting antenna, but such a method has been found to be unsatisfactory for reasons which appear hereinafter.

It is an object of the present invention to provide a novel radio direction finding system for accurately determining the direction to a distant station which has an energy radiation pattern that is movable in space.

It is a further object of this invention to provide a novel radio direction finding system that will accurately locate the position of a distant transmitting station having either a fixed or moving energy radiation pattern.

For a better understanding of the invention together with other and further objects thereof, reference is had to the following description taken in connection with the accompanying drawings in which:

Fig. 1 is a diagrammatic view of the preferred embodiment of the present invention;

Fig. 2 is a block diagram of a portion of the indicator circuit that forms a part of this invention;

Figure 3:
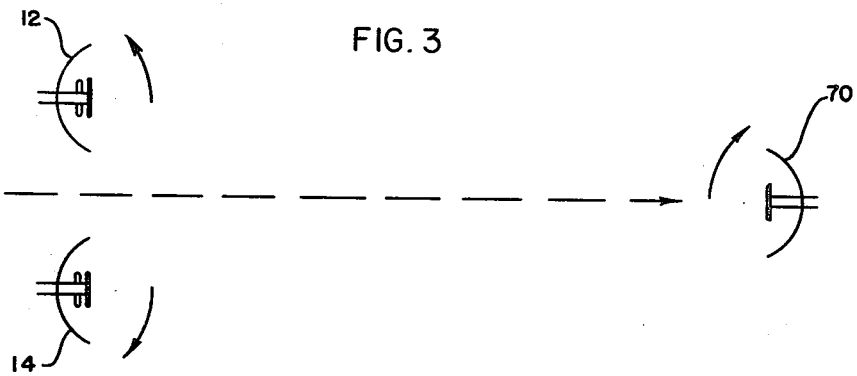
Fig. 3 is a schematic drawing showing the relative positions and directions of rotation of the direction finder and transmitting station antennas.

Reference is now had to the diagrammatic view of an embodiment of the invention, shown in Fig. 1 of the drawings. Two directional antenna arrays 12 and 14 are so mounted that they may be rotated in an azimuthal plane. In the illustrated embodiment, each of the arrays 12 and 14 consists of a radiating element and a parabolic reflector, well adapted for use in the microwave frequency region. Diagrammatically represented gear boxes 16 and 18 support the arrays 12 and 14, as illustrated, provide the necessary means to cause arrays 12 and 14 to rotate in azimuth, and provide the rotating joints necessary to connect stationary transmission lines 20 and 22 to the rotating antenna arrays. A motor 24 is mechanically connected to a differential gear box 26 mechanically coupled between gear boxes 16 and 18. In Fig. 1 the mechanical connection between motor 24 and differential gear box 26 is diagrammatically represented by a dashed line bearing the reference numeral 28, and the mechanical connections between box 26 and boxes 16 and 18 are represented by dashed lines bearing reference numerals 30 and 32, respectively. A handwheel 34 controls differential gear box 26 through the mechanical connection 36, to provide incremental changes in the coincident directions of antennas 12 and 14, as will appear. Transmission lines 20 and 22 connect antenna arrays 12 and 14, respectively, to an indicator 38. Indicator 38 may be any type that conveniently presents the instantaneous strength of signals received from two antennas as a function of the instantaneous positions in azimuth of the respective antennas.

Antennas 12 and 14 are rotated in opposite directions at equal angular rates. The rotation of antennas 12 and 14 in opposite directions in azimuth causes them to point in the same direction twice each revolution. In accordance with the invention, provision is made to change the coincident directions, the positions in azimuth at which the two antennas point in the same direction. Motor 24 provides the power for rotating antennas 12 and 14, while gear boxes 16, 18 and 26 or mechanisms of like function cause antennas 12 and 14 to rotate oppositely and afford control over the coincident directions. Handwheel 34 of differential gear box 26 is the manual control for causing an incremental change in azimuth for one or both of antennas 12 and 14 in addition to the change in azimuth produced by motor 24. Suitable gear systems for performing these mechanical operations are well known in the art. An alternative means for making connection between units would be to provide suitable servo-Selsyn systems to replace the mechanical connections herein shown. In instances where this locating system is to be used to locate stations lying in a complete 360° sector about the system, it may be desirable to change the mounting positions of antennas 12 and 14 so that neither one will cause a shadow in the receiving pattern of the other.

Fig. 2 illustrates in block diagram form one circuit that may be used in indicator 38, Fig. 1. In this circuit, a detector 50, Fig. 2, receives signals from antenna array 12, Fig. 1, and provides an output potential that is proportional in amplitude to the amplitude of the signals being supplied thereto. The output of detector 50 is connected to a sine potentiometer 52 and a cosine potentiometer 54. Potentiometers 52 and 54 are connected through an electronic switch 56 to the vertical and horizontal deflection plates 90 and 91, respectively, of a cathode ray tube that forms a part of the indicator circuit. Sine potentiometer 52 and cosine potentiometer 54 are mechanically so connected that their control arms rotate in synchronism with antenna array 12.

In a similar manner the signals from antenna 14 are applied to a detector 58. The output of detector 58 is connected to a sine potentiometer 60 and to a cosine potentiometer 62 which are in turn connected through electronic switch 56 to the vertical and horizontal deflection plates 90 and 91, respectively, of the cathode ray tube of indicator 38. Electronic switch 56 may comprise a square wave generator and other circuits, and acts as a double-pole, double-throw switch that connects the vertical plates 90 alternately to sine potentiometer 52 and sine potentiometer 60, and connects the horizontal plates 91 alternately to cosine potentiometer 54 and cosine potentiometer 62. Dashed lines 64 represent the first set of connections made by switch 56 and dashed lines 66 represent the second set of connections made by switch 56. Ordinarily the switching operation performed by electronic switch 56 occurs at a fairly rapid rate so that blanking of the cathode ray beam is not necessary. For completeness, however, electronic switch 56 is here provided with a signal output lead 68 which applies to the intensity control grid 92 of the cathode ray tube a blanking pulse at the instant that the switching operation takes place.

To those familiar with indicator circuits it will be apparent that displacing the cathode ray beam in a horizontal direction by an amount proportional to the product of the received signal intensity and the cosine of the instantaneous azimuth angle of the receiving antenna, and at the same time displacing the cathode ray beam in a vertical direction by an amount proportional to the product of the signal intensity and the sine of the instantaneous azimuth angle, produces an indication which is a polar plot of the intensity of the received signal as a function of the azimuth of the antenna.

Fig. 3 is a schematic drawing showing the relative placement of antenna arrays 12 and 14 and the antenna array 70 of the unknown transmitter. It should be understood that the distance between antenna 70 and the direction finding equipment including antenna arrays 12 and 14 is very great compared to the spacing between arrays 12 and 14. In Fig. 3, array 12 is shown rotating counterclockwise while array 14 rotates in a clockwise direction. The reverse directions of rotation will work equally well, but arrays 12 and 14 should at all times rotate in opposite directions. Antenna array 70 is here shown rotating in a clockwise direction, but normally the rotation of antenna 70 is not under the control of the operator of this direction finding system, and the direction of rotation of this antenna does not affect the operation of this direction finding system.

Figure 4:
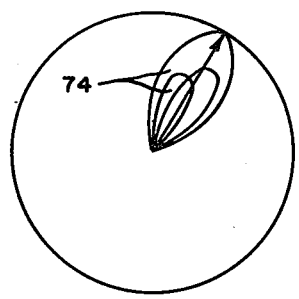
Figs. 4 and 5 represent patterns upon indicator screens of prior art direction finders.
Figure 5:
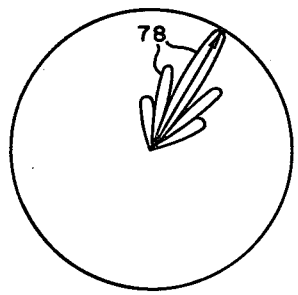

The operation of this system as well as the advantages thereof may best be understood by first referring to presentations provided by conventional direction finding systems employing only one rotating antenna array. Two such presentations are shown in Figs. 4 and 5 of the drawings. Figs. 4 and 5 are polar plots traced on a cathode ray oscilloscope screen of the signal strength from the antenna array plotted as a function of the azimuth of the receiving antenna array. The presentation of Fig. 4 corresponds to a system in which the receiving antenna array of the direction finding system is rotated at a high speed relative to the speed of rotation of the antenna of the distant transmitting station. Several loops 74 thus appear in the presentation shown in Fig. 4. A single loop 74 is generated during one complete revolution of the antenna of the direction finder. The maximum amplitude of the loops increase in size as the maximum point in the energy radiation pattern of the transmitting station rotates toward the direction finding station, and the loops decrease in size as the maximum point rotates away from the direction toward the direction finding system. The directions drawn through maximum values of the various loops are displaced from the true direction of the transmitting station by amounts dependent upon the relative direction of rotation of the transmitting and receiving antennas, the relative speeds of rotation of the receiving and transmitting antennas and the relative angular positions of the two antennas as each loop is traced. Accuracy can be obtained in this system only when the speed of rotation of the receiving antenna is high compared to the speed of rotation of the transmitting antenna. It is usually impractical to rotate the receiving antenna at a rate of speed sufficiently high to obtain accurate results, due to the mechanical difficulties involved.

In Fig. 5 there is shown a typical presentation on an indicator of a direction finding system in which the single antenna rotates at a low speed relative to the speed of rotation of the transmitting antenna. In the pattern shown in Fig. 5, a single loop 78 is traced during a complete revolution of the transmitting antenna. Again it can be seen that the directions of the maxima of the various loops are displaced from the true direction to the transmitting antenna. The direction of the maximum of the largest loop would indicate approximately the direction to the transmitting station, but it is difficult to provide an indicator that will retain the images long enough to make accurate comparisons of the loop sizes, and the time necessary to get an accurate fix on the transmitting station is relatively long with this system as compared to certain other systems.

The disadvantages of prior systems are largely overcome by the present invention. Antennas 12 and 14 of Fig. 1 rotate in opposite directions at equal speeds which are preferably slightly higher than the speed of rotation of the transmitting antenna. Antennas 12 and 14 are designed to have receiving patterns which are mirror images of each other. This is most easily done by making the receiving pattern of each antenna symmetrical about the axis of the antenna. Each of the antennas 12 and 14 causes an indication, upon the cathode ray tube indicator that forms a part of indicator 38, that is similar to the indication shown in Fig. 4 except that the pattern may have fewer loops. The patterns from each antenna are presented individually but simultaneously on the indicator tube by means of the circuit shown in Fig. 2 or by a circuit that performs a similar function. The indications from the two antennas as presented on the indicator screen will not be equal, unless one of the two coincident directions of antennas 12 and 14 is the true direction to the transmitting station. To locate a transmitting station with this system, handwheel 34 is rotated until the size of the two indications on the screen of the indicator are equal, at which time the coincident azimuths or directions of the antennas 12 and 14 are in line with the transmitting station. The screen of the indicator may conveniently have concentric circles marked on the face thereof to aid in determining the size of each presentation. With the presentations adjusted to equal amplitudes, the direction to the transmitting station may be determined by noting the azimuth at which antennas 12 and 14 point in the same direction.

Figure 6:
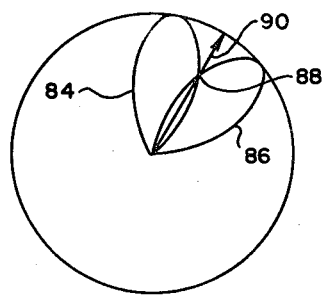
Fig. 6 is a typical pattern upon the indicator screen of the apparatus shown in Fig. 1.

An alternative method of determining the direction to the transmitting station is to bisect the angle between the maximum points of any two loops that are traced simultaneously on the indicator screen. Reference to Fig. 6 of the drawings will indicate how this may be done. In Fig. 6 only one loop from each antenna is shown so as not to confuse the picture. For purposes of this explanation, it may be assumed that the signals that produced loop 84, Fig. 6, were obtained from antenna 12, Fig. 1, and the signals that produced loop 86, Fig. 6, were obtained from antenna 14, Fig. 1. Since loops 84 and 86 are mirror images of each other, the point 88 at which they intersect lies on the bisector of the angle between the maximum points of the two loops 84 and 86. Arrow 90 which extends from the center of the indicator screen through point 88 indicates the true direction to the transmitting station. In practice, arrow 90 may be a line etched on a suitable scale that may be rotated to coincide with the point of intersection 88 on the indicator screen, and the indicator screen may be provided with an azimuth scale, as an aid in determining the azimuth to the transmitting station. Referring still to Fig. 6, successive loops presented on the indicator will vary in amplitude, and the angle between the maxima of the loops will also vary, but the intersections of corresponding loops will all lie along the line indicated by arrow 90, Fig. 6.

An obvious modification of this invention is to display the information from each antenna on a separate cathode ray tube indicator and to provide visual means for superimposing the indications displayed on the two indicators.

This invention as previously stated will accurately locate the position of a distant transmitting station having an energy radiation pattern that is not fixed in space. The movement of the radiation pattern may be accomplished by electrically or mechanically altering the directional properties of the transmitting antenna or the power output of the distant station may be modulated in a periodic or random manner. The modulation of the power output of the distant station would cause appreciable errors in conventional direction finders but, if the present invention is employed in the manner described above, the direction to the transmitting station may be accurately determined under all conditions.

Several advantages of the present invention are: that it accurately locates the position of a transmitting station having a rotating antenna; that it employs antennae that rotate at a moderate rate of speed; that the individual circuits are relatively simple and do not differ materially from existing indicator circuits; that the presentation on the indicator is such that an operator with relatively little practice may accurately locate the position of a transmitting station; and that this invention may be employed to locate transmitting stations having either fixed or rotating antennas.

While there has been described what is at present considered the preferred embodiment of the invention, it will be obvious to those skilled in the art that various changes and modifications may be made therein without departing from the invention.

What is claimed is:

1. A radio direction finding system for locating a distant transmitting station having a variable energy radiation pattern, said direction finding system comprising first and second directional antenna arrays, each of said arrays being adapted to receive signals from said distant transmitting station, means for rotating said antenna arrays in opposite azimuthal directions at a predetermined angular rate, indicator means, means for simultaneously presenting on said indicator means polar plots of the amplitudes of signals received by each of said arrays as a function of the corresponding angular position of each of said arrays, means for causing an incremental angular displacement in azimuth of at least one of said arrays to equalize the magnitude of the polar plots on said indicator, and means associated with said indicator means for indicating the represented position in azimuth at which the polar plot of the signal from said first array intersects the polar plot of the signal from said second array, said azimuth of intersection indicating the azimuth from said direction finding system of said distant transmitting station.

2. Apparatus in combination with the apparatus recited in claim 1, comprising means for indicating the azimuth at which the azimuth of said first and said second arrays are equal, said indicating means thereby indicating the azimuth to said transmitting station.

DONALD D. FOSTER.

REFERENCES CITED

The following references are of record in the file of this patent:

UNITED STATES PATENTS

| Number | Name | Date |
|---|---|---|
| 2,160,093 | Smith | May 30, 1939 |
| 2,169,742 | Scharlau | Aug. 15, 1939 |
| 2,215,785 | Gallant | Sept. 24, 1940 |
| 2,231,929 | Lyman | Feb. 18, 1941 |
| 2,302,902 | Weagant | Nov. 24, 1942 |
| 2,326,662 | Lindenblad | Aug. 10, 1943 |